March 26, 1963  G. M. ANDREW  3,082,622
ANGLE OF ATTACK AND SIDESLIP INDICATOR
Filed Sept. 27, 1956  4 Sheets-Sheet 1

*INVENTOR.*
GUSTAV M. ANDREW
BY *Thomas L. MacDonald*

ATTORNEY

March 26, 1963 G. M. ANDREW 3,082,622
ANGLE OF ATTACK AND SIDESLIP INDICATOR
Filed Sept. 27, 1956 4 Sheets-Sheet 4

INVENTOR.
GUSTAV M. ANDREW
BY Thomas S. MacDonald
ATTORNEY

United States Patent Office 3,082,622
Patented Mar. 26, 1963

3,082,622
ANGLE OF ATTACK AND SIDESLIP INDICATOR
Gustav M. Andrew, Fullerton, Calif., assignor to
North American Aviation, Inc.
Filed Sept. 27, 1956, Ser. No. 612,385
15 Claims. (Cl. 73—180)

The present invention concerns an angle of attack and sideslip meter. More particularly, the invention is directed to a meter for measuring true angle of attack and sideslip at various speeds including supersonic in aircraft and missiles. The meter is especially characterized by the absence of external moving parts and the lack of any requirement for corrections due to Mach number or atmospheric variations.

The term "aerodynamic angle" as used herein means the angle between a given reference line or plane, generally passing through the longitudinal axis of the aircraft or missile, and the direction of the airstream going past the aircraft or missile. This term thus includes both angles of attack or pitch and angles of sideslip. The true angle of attack is defined as an angle between a stationary reference line fixed in the airplane and the relative wind velocity vector at infinity. It is desired that a true aerodynamic angle meter should determine angles of attack or sideslip in flight with high accuracy of about plus or minus 0.1 degree at subsonic and supersonic speeds at altitudes between sea level and 100,000 feet.

Heretofore various types of angle of attack meters have been proposed. Generally speaking, these have been of the pneumatically actuated type such as seen in Patent No. 2,237,306 or devices which must be corrected for Mach number deviations and atmospheric variations as seen in Patent No. 2,699,065. The present invention basically provides an aerodynamic angle meter comprising a pair of spaced members projecting into the airstream at various incident angles to a reference line or plane and means to produce electrical signals proportional (1) to aerodynamic forces either in the form of a normal force vector or an air pressure on predetermined surfaces of the members and (2) to the incident angles, with computer means to derive the aerodynamic angle from the signals.

An object of this invention is to provide a new aerodynamic angle meter.

A further object of this invention is to provide an accurate indicator of the angles of attack and sideslip of an aircraft or missile.

A still further object of this invention is to provide an aerodynamic angle meter having no moving external parts and not necessitating corrections for atmospheric and Mach number variations.

An additional object of this invention is to provide a meter capable of measuring true angle of attack or sideslip.

Another object of this invention is to provide a pair of pressure or force sensing members external of an airplane or missile rigged at various angles with respect to a selected reference line.

A further object of this invention is to provide various means for obtaining finite values for the angle of attack of an airplane or missile in terms of force or pressure relationships and the angle of incidence of a pair of members extending into the airstream.

The above objects as well as other objects of this invention will be apparent from the following specification and description of the accompanying drawings in which.

Figure 10:
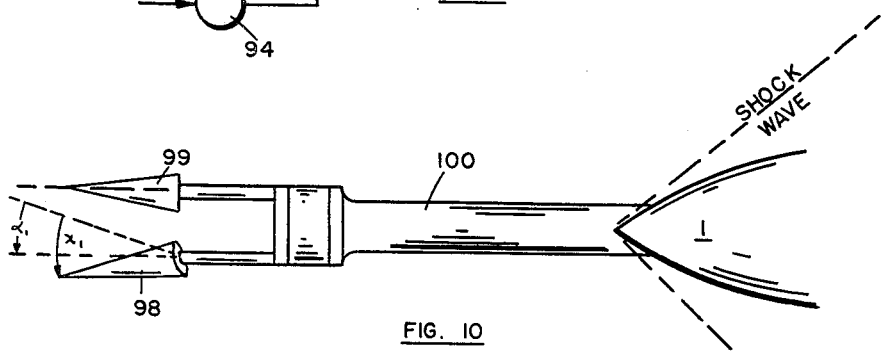

And FIG. 10 shows a mounting means for a pair of cone sensors of this invention.

Figure 1:
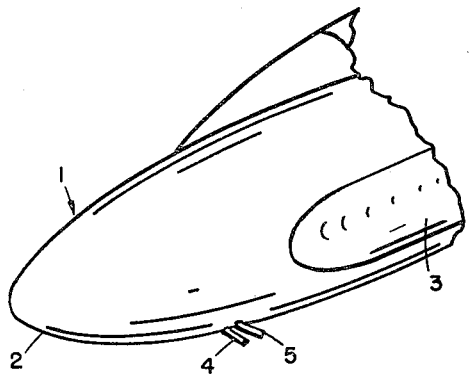
FIG. 1 shows sensing members of this invention externally of an airplane.

The system of this invention comprises at least a pair of members generally having the same shape and size mounted at least in part externally of an airframe. The center line or a plane of a first member is rigged at an angle $i_1$ with respect to a selected reference line or plane while the center line or plane of a second member is rigged at a different angle $i_2$ to the reference line or plane. The velocity vector of the airstream and the reference line or plane form the angle of attack $\alpha$. As seen in FIG. 1, the sensor members take the form of a pair of vanes 4 and 5 which extend externally of the skin 2 of an airframe or missile 1 at a position ordinarily removed from the influence of other external airframe structure such as wings 3 or the like.

Figure 2:
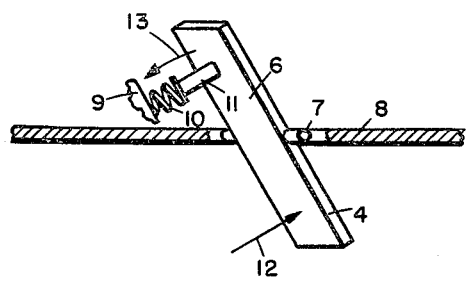
FIG. 2 shows the forces upon one of the sensing vanes of this invention.

In FIG. 2, a detailed view of a vane, the vane has a portion 4 external of the airframe skin 8 and an internal portion 6; the entire vane being pivoted on pivots normal to the vane front surface. The aerodynamic force 12 normal to the external vane portion 4 results in a turning moment 13 which tends to pivot the vane. A null forcing means 9 is provided to restrain movement of the vane 6 by means of a spring restraint 10 and spring attachment means 11. As hereinafter explained movement of the vane 6 is sensed and a force is applied through the means 9 to keep the vane in its present position. Normal force $N_1$ and $N_2$ acting on the vanes 4 and 5 seen in FIG. 1 are:

$$N_1 = C_{N\alpha}\alpha_1 Sq = C_{N\alpha}(\alpha + i_1)Sq \qquad (1)$$

$$N_2 = C_{N\alpha}\alpha_2 Sq = C_{N\alpha}(\alpha + i_2)Sq \qquad (2)$$

Where $C_{N\alpha}$ is the lift curve slope found by plotting angle of attack vs. lift or force normal to the vane, $S$ the area of the vane, and $q$ the dynamic pressure. From these equations we get:

$$C_{N\alpha} = \frac{N_1 - N_2}{(i_1 - i_2)Sq} \qquad (3)$$

This equation substituted into the first equation gives:

$$\alpha_1 = \frac{N_1}{N_1 - N_2}(i_1 - i_2) \qquad (4)$$

But since $$\alpha = \alpha_1 - i_1 \qquad (5)$$

$$\alpha = \frac{N_1}{N_1 - N_2}(i_1 - i_2) - i_1 \qquad (6)$$

Since $i_1$ can be made 0 by rigging one of the vanes on the reference line or plane then $$\alpha = \frac{N_1}{N_2 - N_1}i_2 \qquad (7)$$

The normal forces $N_1$ and $N_2$, which are in effect the differential normal force on opposite surfaces of the members, are determined by direct measure in flight in the manner hereinafter described while the incident angles can be measured with extreme precision in the original airframe or missile frame installation. It is seen that no corrections are necessary for Mach number or atmospheric variations in the above formula. For measuring supersonic speeds the sensing members are placed ahead of the shock wave in order to measure true angle of attack without interference or disturbances from the aircraft itself.

Figure 8:
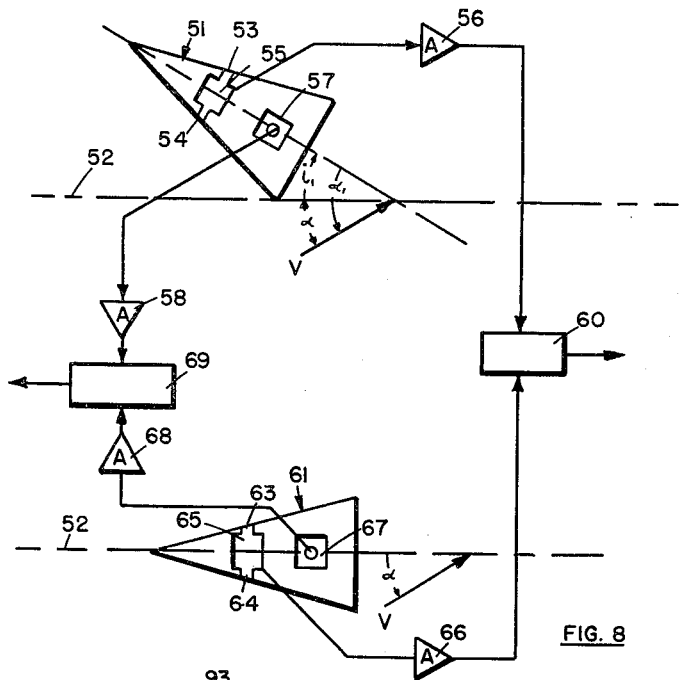
FIG. 8 shows the principle of the present invention as applied to a wedge, cone or other body of revolution.
Figure 9:
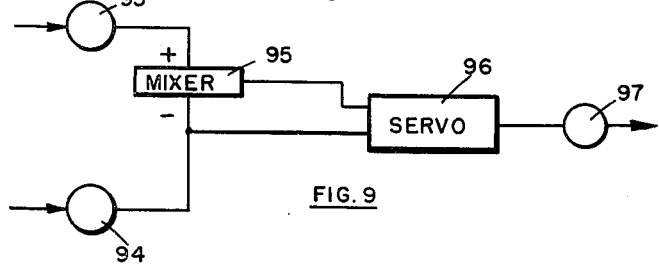
FIG. 9 shows the schematic of a computer usable with the pressure sensors of FIG. 8.

In the modification seen in FIGS. 8–10, the sensing members take the form of wedges, cones or other bodies of revolution which have their center lines rigged at differing angles $i_1$ and $i_2$ to a reference line, respectively. The angle $i_2$ is preferably selected as equaling zero, namely, that it is parallel to the reference line. Each of the cones or wedges have at least two pressure orifices in a vertical reference plane formed by having the cone axis originally in a plane parallel to the aircraft plane of symmetry, the orifices being on opposite surfaces of the sensing members. Pressures from the upper and lower orifices on each of the members act on a pressure transducer which converts the differential pressure into an electrical signal. The angles of attack on the center line of a wedge or the axis of a cone are:

$$\alpha_1 = \alpha + i_1 \text{ and } \alpha_2 = \alpha + i_2$$

A similar relationship exists with respect to the angles of sideslip, the following discussion being pertinent to both cases. It has been found that for a moderate range of aerodynamic angles that the differential pressure $\delta p$ on the cones and on the wedges is a linear function of angle of attack or sideslip.

Thus:

$$\frac{\delta p}{\delta \alpha} = p_\alpha \qquad (8)$$

The differential pressure between upper and lower orifices is:

$$\delta p_1 = p_\alpha \alpha_1 = p_\alpha (i_1 + \alpha) \qquad (9)$$

while $$\delta p_2 = p_\alpha \alpha_2 = p_\alpha (i_2 + \alpha) \qquad (10)$$

From these equations $$p_\alpha = \frac{\delta p_2}{\alpha + i_2} \qquad (11)$$

Subtraction of Equation 10 from Equation 9 yields:

$$\delta p_1 - \delta p_2 = p_\alpha (i_1 - i_2) \qquad (12)$$

Substituting equation $$p_\alpha = \frac{\delta p_2}{\alpha + i_2}$$

into Equation 12 gives:

$$\delta p_1 - \delta p_2 = \frac{\delta p_2}{\alpha + i_2}(i_1 - i_2) \qquad (13)$$

which solved for $$\alpha = \frac{\delta p_2}{(\delta p_1 - \delta p_2)}(i_1 - i_2) - i_2 \qquad (14)$$

and when $i_2 = 0$, $$\alpha = i_1 \frac{\delta p_2}{(\delta p_1 - \delta p_2)} \qquad (15)$$

Equation 15 gives the measured angle of attack $\alpha$ without any complicated correction for Mach number or atmospheric variations since these influences are included in the pressures which are measured directly. It can be seen that Equation 6 is a generic expression for the relationship in Equation 14, the latter being based on differential pressures as distinguished from the inclusive aerodynamic forces of Equation 6. The remainder of this specification deals with the various structure and mechanisms to solve the above equations and to equate them in terms of the actual aerodynamic angle of the airplane or missile.

Figure 3:
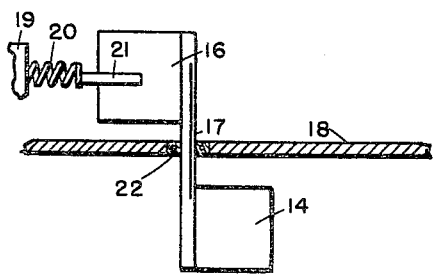
FIG. 3 shows a modified form of vane in which the hinge or connecting link is parallel to the plane of symmetry of the vane.

FIG. 3 is a modification of the vane members of FIG. 2 in which the hinge or linkage 17 between vane portions 14 and 16 is in a plane parallel to the plane of symmetry of the vane sections. Forces acting on the external vane portion 14 act to twist hinge 17 and, in turn, to push vane 16 with a rotating moment. Similarly to FIG. 2, a null forcing means 19 with associated spring restraint 20 and attaching means 21 keeps vane section 16, hinge 17 and vane section 14 in the original alignment with respect to the hereinafter described reference line. Vane section 14 is external to the skin 18 of the airframe or missile frame and is generally provided with heating means such as a resistance coil 22 for preventing icing of the mechanism. Heating means in this or equivalent form is ordinarily necessary in each of the disclosed sensor members to prevent icing.

Figure 4:
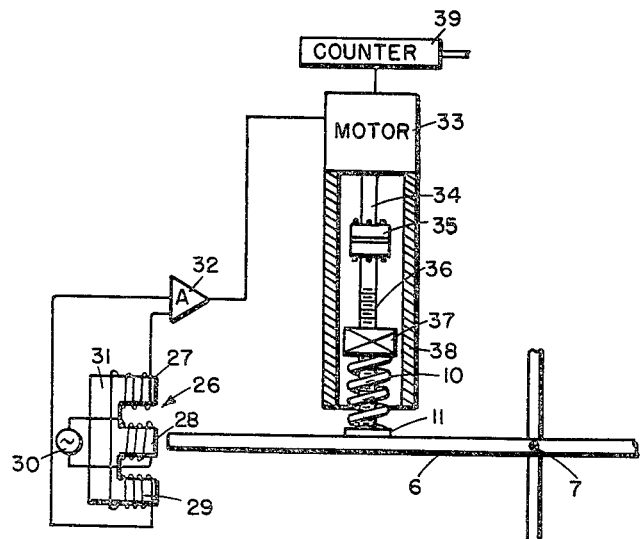
FIG. 4 is a detailed view of a restraining means to determine the aerodynamic force on a vane.

FIG. 4 shows in detail a typical null forcing means which may be employed with the present vanes. An E-type pickoff 26 is provided on the end of vane section 6 which senses fluctuations in the position of such tip end due to varying aerodynamic forces on vane section 4 which act to pivot joint 7. Pickoff 26 is of conventional construction embodying the use of an iron core 31 and coils 27, 28 and 29 on each of the legs of the E provided to give direction and amount of deflection of vane section 6 which is then amplified through amplifier 32. The center coil 28 is supplied with a voltage from generator 30 or other source. The amplified signal from amplifier 32 typically controls a two-phase reversible or other motor 33 which in turn drives shaft 34 and a lead screw 36 through coupling 35. A traveling nut 37 is provided on screw 36 which acts to vary the force on a spring restraint 10 and spring attachment pad 11 in response to the amount of displacement of the tip end of vane section 6. The traveling nut and spring assembly is positioned within a restraining housing 38 extending from the motor casing. The position of the motor 33 also controls the positioning of a counter 39 to indicate a finite value of the force acting on the external vane section 4 and to drive input shafts to the hereinafter described computing means.

Figure 5:
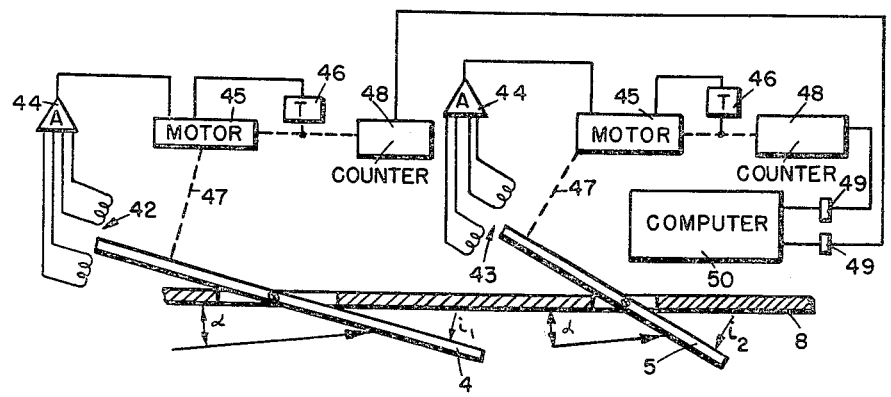
FIG. 5 is a schematic drawing of a pair of rigged vanes and a computing network.

FIG. 5 is a schematic drawing showing the rigged vanes in position along with the force measuring and restraining means. Vane sections 4 and 5 are rigged at angles $i_1$ and $i_2$ with respect to the external skin 8 of the airplane or missile. $\alpha$ is the indicated angle of attack. Pickoffs 42 and 43 are provided on the adjacent ends of the internal sections of the respective vanes. Deflections of the vanes are sensed by these pickoffs which emit a signal dependent upon the amount of fluctuation. This signal is amplified by amplifiers 44 which is fed to motors 45 which provide the spring restraining drive for the restraining units 47 described in detail with respect to FIG. 4. A feedback tachometer 46 is provided with each motor to improve stability, time response and minimize overshoot. Counters 48 are driven off the respective motors and a signal therefrom is fed through potentiometers 49 into a computer 50.

Figure 6:
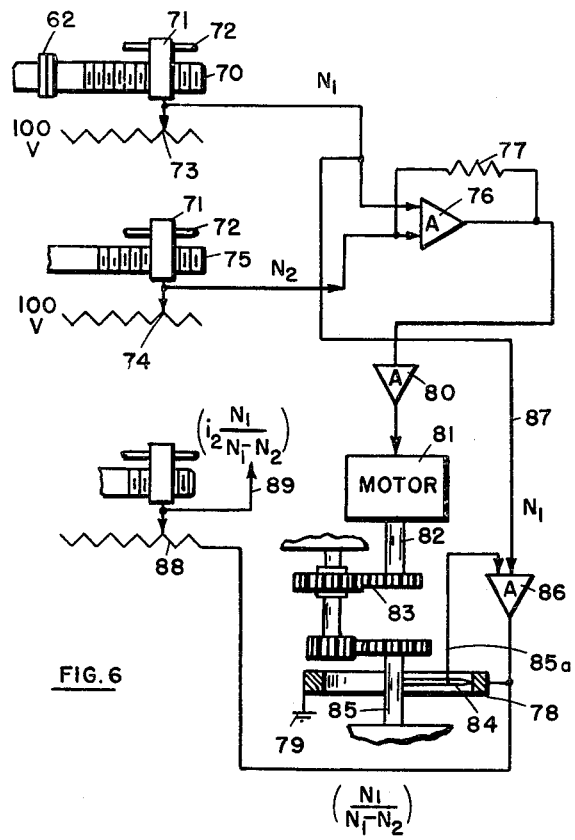
FIG. 6 is a detailed view of a typical computer used for computing the aerodynamic angle.

FIG. 6 shows a typical computer network adapted to solve the equations set out above with respect to the angle of incidence of the vanes and the force upon the vanes. A lead screw 70 is mechanically connected to an output shaft of one of the counters, seen in FIG. 5, through coupling 62. A traveling nut 71 rides on lead screw 70 guided by guide rod 72 which is journalled in the traveling nut. Rotation of the lead screw in response to variable positions of the counter shaft moves the traveling nut 71 along the lead screw 70. A potentiometer pickoff is attached to the nut 71 and acts in conjunction with a resistor as a variable potentiometer 73. The output $N_1$ at any instance from the potentiometer 73 is directly proportional to the force acting on one of the vanes. A similar lead screw 75 is connected to the other of the counters in order to sense the force upon the other of the vanes. This mechanical signal is changed into an electrical signal $N_2$ proportional to the aerodynamic force on the vane through potentiometer 74. The signals $N_1$ and $N_2$ are fed into difference amplifier 76. A bypass resistor 77 of appropriate value is placed in parallel across the amplifier output and both its inputs in order to provide, as conventionally known, subtraction of $N_2$ from $N_1$.

This amplified difference signal is passed into an amplifier 80 which is connected to the field of an electric motor 81. An output shaft 82 of the motor drives a gear train 83. A shaft 85 is attached to the train and acts to rotate a potentiometer wiper arm 84 around the inside periphery of a circular-type potentiometer 78. The potentiometer 78 is grounded at 79 and receives an input from a high-gain amplifier 86 at the opposite end of the potentiometer coil. A signal representing $N_1$ is supplied to this high-gain amplifier through line 87 while a voltage is picked off by the potentiometer wiper 84 which is conducted into the amplifier 86 through line 85a. Other types of dividing mechanisms and circuits may be used in this analog computer. Devices which are fed two voltage signals and give as an output a voltage which represents the division of one input voltage into the other may be used in the computer network. Other dividers suitable for this operation may be seen in "Introduction to Electrical Analogue Computers" by C. A. Wass, published by McGraw-Hill Publishing Company, New York, 1955, pp. 124–128, particularly with reference to FIGURES 74 and 75. The output from the high-gain amplifier 86 thus represents.

$$\frac{N_1}{N_1-N_2}$$

which is fed into a potentiometer 88 having a wiper preset for a particular value of $i_2$. The output from this potentiometer represented by line 89 gives an electrical signal representing the angle of attack $\alpha$ in terms of $$i_2\left(\frac{N_1}{N_1-N_2}\right)$$

which may be fed into an indicating-type meter for visual presentation to a pilot or may be fed into an autopilot for missile or aircraft control purposes. The potentiometer 88 acts, as is well known in the art, to multiply the signal from amplifier 86 and the preset incidence angle of one of the vanes.

Figure 7:
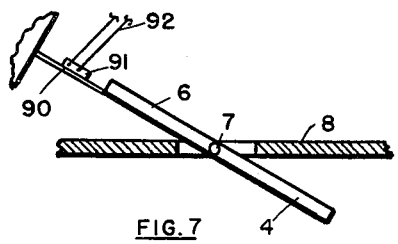
FIG. 7 shows a modification of the means for determining the aerodynamic force on the vane.

FIG. 7 discloses a modified means for sensing the deflection of the vane intersection 6. This means comprises a fixed linkage 90 which is attached to a fixed support at one end and to the vane section 6 at the other. A strain gage 91 having output leads 92 senses the strain which is put on the outside surface fibers of the linkage 90 in proportion to the deflection or bending moment of vane section 6. The force signals from the strain gage 91 are fed into the computing network including suitable amplifiers as seen in FIG. 5.

FIG. 8 shows the present invention employing wedge or cone shaped sensors for allowing simultaneous measure of angle of attack and angle of sideslip. The relationship of the angle of incidence of the sensing members and the positioning of the orifices on each member to give pressure differential signals is discussed above. Optimum performance is had by providing pairs of orifices on the members. Provision of only one orifice on each member will give an approximate value which can be fed into the computer. A pair of sensors 51 and 61 are placed in a common plane at different angles to a reference line 52. For ease of computation, one of the sensors is placed at a zero angle with respect to the reference line 52. As shown in FIG. 8, this is sensor 61. Orifices 53 and 54 are provided on the surfaces of sensor 51 in order to pick up the forces in the form of pressures at that particular point on the sloping surface. These pressures are communicated through the orifices 53 and 54 to a pressure differential transducer 55. Such transducer may take the form of that disclosed in NACA publication NACA TN 2659 by John L. Paterson, April 1952. In order to provide for sensing both the angle of attack and angle of sideslip in the same instant, orifices are provided at right angles to the orifices 53 and 54 which lead to a transducer 57. Signals from the transducers 55 and 57 are fed into amplifiers 56 and 58 to provide pressure differential signals for computers 60 and 69. Sensing member 61 likewise has orifices 63 and 64 leading to a pressure transducer 65. Electrical signals from the transducer 65 as well as from a transducer 67, the latter being positioned between orifices at right angles to the orifices 63 and 64, are fed through amplifiers 66 and 68 to computers 60 and 69. Each of the rigged wedges or cones shown in FIG. 8 thus have two sets of orifices at positions 180° to each other. It can be seen that the wedge or cone shown in FIG. 8 may have only one set of orifices and be restricted to measuring either angle of attack or sideslip or may be rotated 90° to measure these angles alternatively. As a further modification the angle of attack and sideslip meters can be combined into one unit by using three cones, one cone being placed so as to provide a zero incident angle for attack and sideslip sensing orifices while the other cones act individually at other incident angles.

FIG. 9 shows a simple analog computing mechanism for solving Equation 15 discussed above. Pressure transducers 93 and 94 provide differential pressures $\delta p_1$ and $\delta p_2$ which are subtracted in the mixer 95 giving $\delta p_1 - \delta p_2$. The division in the Equation 15 is done by a servo loop 96, the output of which is then multiplied in a potentiometer 97 by $i_1$ yielding the angle of attack $\alpha$. Reference may again be had to the above-mentioned Wass publication for details as to a typical analog computing circuit.

FIG. 10 shows a pair of cone sensors 98 and 99 mounted on a short boom 100 on the nose of a fuselage 1. For supersonic speed the present instrument will measure true angle of attack since the sensors are forward of any fuselage shock wave. In the preferred form of the present invention it is desired that cone sensors be used since their linear relationship between differential pressure and angle of attack is superior. It is important that the surfaces of the cone or wedge and the orifices therein be machined or formed with extreme accuracy. For trans-sonic and subsonic speeds, the present instrument will measure only the local angle of attack. In order to obtain the true angle of attack for these speeds, a flight test calibration for a given type of airplane is needed. Once a flight test calibration is made for different Mach numbers, a calibration function generator may reproduce the calibration curve while being driven by a Mach meter; the output of said generator being fed into a multiplying servo along with the local angle of attack, yielding the true angle of attack.

Although the invention has been described and illustrated in detail, it is to be clearly understood that the same is by way of illustration and example only and is not to be taken by way of limitation, the spirit and scope of this invention being limited only by the terms of the appended claims.

I claim:

1. An aerodynamic angle meter for aircraft comprising a first spaced longitudinally extending member adapted for projection into an airstream, said member having an axis thereof at an incident angle to a selected reference line, a second spaced longitudinally extending member adapted for projection into the airstream, said second member having an axis thereof at a different incident angle than said first member, said spaced members being subjected in flight to aerodynamic forces of differing magnitude due to their difference in angular orientation from said reference line, a transducer means in operative communication with each of said first and second members to generate discrete electrical signals indicative of the different aerodynamic forces on each of said members, and computer means responsive to said electrical signals for computing aerodynamic angle according to the difference between one of said incident angles and the product of (a) the difference between said incident angles and (b) the ratio of one of said aerodynamic forces to the difference between said forces.

2. The invention as set out in claim 1 in which said spaced members are wedges extending into the airstream and having orifices on opposite sloping sides thereof to conduct variable pressures to a pressure differential transducer.

3. The invention as set out in claim 1 in which the spaced members are of cone shape and have a pair of orifices 180° apart exposed to the airstream.

4. The invention as set out in claim 1 in which said spaced members comprise a pair of restrained vanes extending in part into the airstream.

5. An aerodynamic angle meter for aircraft comprising a first spaced longitudinally extending member adapted for projection into an airstream, said member having an axis thereof at an incident angle to a selected reference line, a second spaced longitudinally extending member adapted for projection into the airstream, said second member having an axis thereof at a different incident angle than said first member, said spaced members being subjected to aerodynamic forces of differing magnitude due to their difference in angular orientation from said reference line, a transducer means in operative communication with each of said first and second members to generate discrete electrical signals indicative of the different aerodynamic forces on each of said members, and computer means having inputs indicative of each of said incident angles and operative in response to said electrical signals for computing the aerodynamic angle ($\alpha$) according to the formula $$\alpha = \frac{N_1}{N_1 - N_2}(i_2 - i_1) - i_1$$

where $N_1$ and $N_2$ are the aerodynamic forces on the respective first and second members and $i_1$ and $i_2$ are the incident angles of the respective first and second members.

6. The invention as set out in claim 5 in which said members comprise vane members having an equal area projected into the airstream.

7. The invention as set out in claim 5 in which said spaced members comprise cone members having orifices 180° apart leading to a differential pressure transducer associated with said cone.

8. The invention as set out in claim 5 in which said spaced members have a wedge-shaped exterior and said first-mentioned means includes at least one pair of orifices on opposite sides of the wedge and means to sense differential air pressures picked up by said orifices.

9. The invention as set out in claim 4 in which electrical pickoffs sense deflections of each of said vanes and a servo motor responsive to a signal from said pickoffs compresses a spring against each vane to effect restraint thereof.

10. The invention as set out in claim 4 in which a spring provides restraint of each of said vanes and a strain gage on each of said vanes detects deflections of said vanes proportional to the aerodynamic forces on said vanes.

11. An aircraft angle of attack meter comprising a first pressure sensor projecting into the airstream at an incident angle to a selected reference line, a second pressure sensor spaced from said first pressure sensor projecting into the airstream at a different incident angle than said first pressure sensor, orifice means on opposite sides of each of said pressure sensors, a pressure transducer in communication with said opposite orifice means in each pressure sensor adapted to convert differential pressures from said opposite orifice means to electrical signals indicative of the aerodynamic forces on each of said sensors, and computer means having an input indicative of said incident angles and operative in response to said signals and said input for computing the angle of attack ($\alpha$) according to the formula $$\alpha = \frac{N_1}{N_1 - N_2}(i_2 - i_1) - i_1$$

where $N_1$ and $N_2$ are the differential pressures indicative of aerodynamic force on the respective pressure sensors and $i_1$ and $i_2$ are the incident angles of said pressure sensors.

12. An aircraft aerodynamic angle meter comprising a first cone member projecting into an airstream at an incident angle to a selected reference line, a second cone member spaced from said first cone member and projecting into the airstream at a different incident angle than said first cone member, at least one pair of orifices at 180° spaced positions on each of said cone members, transducer means in pressure communication with each of said pairs of orifices to generate a pressure differential electrical signal proportional to the pressure differential between said spaced orifices on each of said cone members, and computer means having an input indicative of said incident angles and operative in response to said electrical signals and said input for computing the aerodynamic angle $\alpha$ according to the formula $$\alpha = \frac{\delta p_2}{(\delta p_1 - \delta p_2)}(i_1 - i_2) - i_2$$

where $\delta p_1$ and $\delta p_2$ are the pressure differentials on each of said cone members and $i_1$ and $i_2$ are the incident angles of said cone members.

13. An aircraft aerodynamic angle meter comprising a first wedge projecting into an airstream at an incident angle to a selected reference line, a second wedge member spaced from first wedge member and projecting into the airstream at a different incident angle than first wedge member, at least one pair of orifices at spaced positions on each of said wedge members, transducer means in pressure communication with each of said pairs of orifices to generate a pressure differential electrical signal proportional to the pressure differential between said spaced orifices on each of said wedge members, and computer means having an input indicative of said incident angles and operative in response to said electrical signals and said input for computing the aerodynamic angle $\alpha$ according to the formula $$\alpha = \frac{\delta p_2}{(\delta p_1 - \delta p_2)}(i_1 - i_2) - i_2$$

where $\delta p_1$ and $\delta p_2$ are the pressure differentials on each of said wedge members and $i_1$ and $i_2$ are the incident angles of said wedge members.

14. An aerodynamic angle meter for aircraft comprising a first spaced longitudinally extending member adapted for projection into an airstream, said member having an axis thereof at an incident angle to a selected reference line, a second spaced longitudinally extending member adapted for projection into the airstream, said second member having an axis thereof at a different incident angle than said first member, said spaced members being subjected to aerodynamic forces of differing magnitude due to their difference in angular orientation from said reference line, a transducer means in operative communication with each of said first and second members to generate discrete electrical signals indicative of the different aerodynamic forces on each of said members, and computer means having an input indicative of one of said incident angles and operative in response to said electrical signals for computing the aerodynamic angle ($\alpha$) according to the formula $$\alpha = i_1 \frac{N_2}{N_1 - N_2}$$

where $N_1$ and $N_2$ are the aerodynamic forces on the respective first and second members, and $i_1$ is the incident angle of one of said members when the incident angle ($i_2$) of the other of said members is zero with respect to said reference line.

15. Apparatus for measuring the aerodynamic angle of an aircraft having a reference axis comprising first and second force sensing means, including longitudinally extending portions exposed in flight to an airstream, for generating first and second force signals respectively indicative of aerodynamic forces acting on said portions, said portions being oriented in first and second directions which have different predetermined angular relations to the reference axis of the aircraft, and computing means responsive to said signals for calculating the ratio of one of said force signals to the difference between said force signals, and means for computing an output signal indicative of said aerodynamic angle of said aircraft according to the difference between one of said predetermined angular relations and the product of (a) said ratio and (b) the difference between said predetermined angular relations.

References Cited in the file of this patent
UNITED STATES PATENTS

| | | |
|---|---|---|
| 2,029,700 | Bowkow | Feb. 4, 1936 |
| 2,352,955 | Johnson | July 4, 1944 |
| 2,530,981 | Mikina | Nov. 21, 1950 |
| 2,767,579 | Faget | Oct. 23, 1956 |